Patented July 18, 1939

2,166,554

UNITED STATES PATENT OFFICE 2,166,554

1-NAPHTHALENEACETIC ACID

Richard O. Roblin, Jr., Old Greenwich, and Ingenium Hechenbleikner, Riverside, Conn., assignors to American Cyanamid Company, New York, N. Y., a corporation of Maine No Drawing. Application June 30, 1938,
Serial No. 216,752

3 Claims. (Cl. 260—515)

This invention relates to an improved process for the synthesis of 1-naphthaleneacetic acid, and an improved product.

1-naphthaleneacetic acid is one of the plant hormones favoring growth. Its synthesis in the past has presented serious difficulties both from the standpoint of cost and purity of the product. Essentially, the processes have involved the production of 1-naphthalene-methyl cyanide which is then saponified to produce the 1-naphthaleneacetic acid. It has been proposed to obtain the nitrile by starting from methyl naphthalene by bromination and treatment with potassium cyanide. This process produces both poor yields and a product contaminated with impurities which are difficult to remove and which hitherto have never been removed completely. It is an additional feature of the present invention that a new pure 1-naphthaleneacetic acid is produced which has never hitherto been obtained.

According to the present invention, 1-naphthylmethyl chloride is prepared from naphthalene, formaldehyde, hydrochloric acid and sulfuric acid, and the crude reaction product without isolation is dissolved in a suitable solvent such as ethanol and treated with sodium cyanide. Hydrolysis is then effected, preferably without separation, and the 1-naphthaleneacetic acid is then recrystallized from water yielding a product having a melting point of between 134° and 135° C., whereas the product which has been hitherto known had a melting point of not over 132° C.

Other cyanides may be used in place of sodium cyanide, but it is an advantage of the present invention that it is not necessary to employ the more expensive potassium cyanide as high yields and excellent purity are obtainable with the sodium compound.

The invention will be described in detail in the following specific example, it being understood that the invention is not limited to the exact procedural details set forth.

Example

A mixture of 256 parts of refined naphthalene, 250 parts by volume of 30% formaldehyde solution and 424 parts by volume of concentrated hydrochloric acid are placed in a kettle equipped with an efficient stirring device. The temperature is maintained at 65° to 70° C. and 278 parts by volume of concentrated sulfuric acid are introduced gradually during 6 to 7 hours, stirring being vigorous. After all of the sulfuric acid has been added, the mixture is heated at 60° C. for an additional 20 hours.

The mixture is then cooled, and an equal volume of cold water is added. Separation into layers takes place, one being a light colored oil which is separated from the aqueous layer and washed with water and sodium bicarbonate until neutral. Approximately 250 parts of oil are obtained.

The crude 1-naphthylmethyl chloride is dissolved in 250 volumes of 90% ethanol and treated with 72.5 parts of sodium cyanide. The mixture is refluxed for 12 hours on a steam bath. The 1-naphthalene acetonitrile, without isolation, is then treated with 100 parts of sodium hydroxide and the mixture refluxed for an additional 10 hours. The alcohol is then removed by distillation and the residue is dissolved in just sufficient water to effect solution which is slightly dark colored. The solution is then extracted with ether and the water layer separated and heated for a short time to drive off any solvent remaining. The warm water layer which is a solution of the sodium salt of 1-naphthaleneacetic acid is then treated with 425 volumes of 25% sulfuric acid followed by cooling. The 1-naphthaleneacetic acid separates out and is filtered with suction. The yield is 235 parts or 70% based on the original naphthalene.

The crude product has a melting point of 125° C. After one recrystallization from water, the melting point is 130° C. and after a second, 134° to 135° C.

Instead of using ether for extracting impurities from the water solution, a hydrocarbon solvent such as petroleum ether may be used.

What we claim is:

1. A process of producing 1-naphthaleneacetic acid which comprises reacting naphthalene with formaldehyde, hydrochloric acid and sulfuric acid to produce 1-naphthlymethyl chloride, separating the crude 1-naphthylmethyl chloride, from unreacted acid, dissolving the crude 1-naphthylmethyl chloride in an organic solvent, heating it with an alkali metal cyanide, adding caustic alkali to the reaction mixture and heating until hydrolysis has taken place, removing the organic solvent by distillation, acidifying and separating out the 1-naphthaleneacetic acid.

2. A process of producing 1-naphthaleneacetic acid which comprises reacting at 60° to 70° C. naphthalene with formaldehyde, hydrochloric acid and sulfuric acid to produce 1-naphthylmethyl chloride, separating the crude 1-naphthylmethyl chloride from unreacted acid, dissolving the crude 1-naphthylmethyl chloride in 95% ethanol, heating it with sodium cyanide, adding caustic alkali to the reaction mixture and heating until hydrolysis has taken place, removing the ethanol by distillation, acidifying and separating out the 1-naphthaleneacetic acid.

3. A process of producing 1-naphthaleneacetic acid which comprises reacting at 60° to 70° C. naphthalene with formaldehyde, hydrochloric acid and sulfuric acid to produce 1-naphthylmethyl chloride, separating the crude 1-naphthylmethyl chloride from unreacted acid, dissolving the crude 1-naphthylmethyl chloride in 95% ethanol, heating it with sodium cyanide, adding caustic alkali to the reaction mixture and heating until hydrolysis has taken place, removing the alcohol by distillation, dissolving the residue in water, extracting the solution with an organic solvent for the impurities removing the solvent, acidifying and separating out the 1-naphthaleneacetic acid.

RICHARD O. ROBLIN, Jr.
I. HECHENBLEIKNER.